US008367131B2

(12) United States Patent
Kristensen et al.

(10) Patent No.: US 8,367,131 B2
(45) Date of Patent: Feb. 5, 2013

(54) METHOD OF MONITORING THE BREAKING OF EGGS, AN EGG RECEIVING DEVICE FOR HOLDING THE CONTENTS OF AN EGG, AND AN EGG BREAKING APPARATUS COMPRISING SUCH AN EGG RECEIVING DEVICE

(75) Inventors: Jens Kristian Kristensen, Odense (DK); Jan Holm Holst, Odense (DK); Martin Sørensen, Allesø (DK)

(73) Assignee: Sanovo Engineering A/S, Odense SV (DK)

( * ) Notice: Subject to any disclaimer, the term of this patent is extended or adjusted under 35 U.S.C. 154(b) by 617 days.

(21) Appl. No.: 11/577,401

(22) PCT Filed: Feb. 23, 2006

(86) PCT No.: PCT/DK2006/000105
§ 371 (c)(1),
(2), (4) Date: Jun. 18, 2007

(87) PCT Pub. No.: WO2007/095942
PCT Pub. Date: Aug. 30, 2007

(65) Prior Publication Data
US 2008/0292758 A1 Nov. 27, 2008

(51) Int. Cl.
*A01K 43/00* (2006.01)
*G01N 33/02* (2006.01)
*A23J 1/08* (2006.01)
*A47J 43/14* (2006.01)
(52) U.S. Cl. ............... 426/231; 426/299; 99/499
(58) Field of Classification Search .............. 426/231, 426/299; 99/499
See application file for complete search history.

(56) References Cited

U.S. PATENT DOCUMENTS
2,519,392 A 8/1950 Minton 4,111,111 A * 9/1978 Willsey ................... 99/499
(Continued)

FOREIGN PATENT DOCUMENTS
EP 0621001 A1 10/1994
EP 1 297 769 A2 4/2003
(Continued)

OTHER PUBLICATIONS
Kyowa, "Super Egg Breaker Separater", Food & Eggs Industrial Automation System, Kyowa Machinery, Co., Ltd., Oatno 9305-500.
(Continued)

*Primary Examiner* — Chhaya Sayala
*Assistant Examiner* — Jerry W Anderson
(74) *Attorney, Agent, or Firm* — Sughrue Mion, PLLC

(57) ABSTRACT

The invention relates to a method and an apparatus for monitoring the breaking of eggs. The eggs are fed to a plurality of egg breaking devices by means of a feeder, each egg breaking device receiving one egg at a time, whereupon the shell of each egg are broken by means of the respective egg breaking device and the contents of each egg are collected in an egg receiving device, each egg receiving device receiving the contents of only one egg in each process cycle. The remains held by each egg breaking device after the breaking of the eggshell are discharged to a waste receptacle, and the contents of the egg receiving device are discharged into one or more product receptacles. The monitoring consists in that the presence of at least one of the conditions (a) the egg is dropped, (b) eggshell is unbroken or (c) yolk membrane is broken is registered automatically, and that the presence of an abnormality in the egg-breaking is presented to an operator. The presence of an unbroken egg may be detected as the lack of contents in the egg receiving device, whereas the presence of an egg with a broken yolk membrane may be detected by the presence of yolk in the albumen.

15 Claims, 4 Drawing Sheets

U.S. PATENT DOCUMENTS

Figure 1:
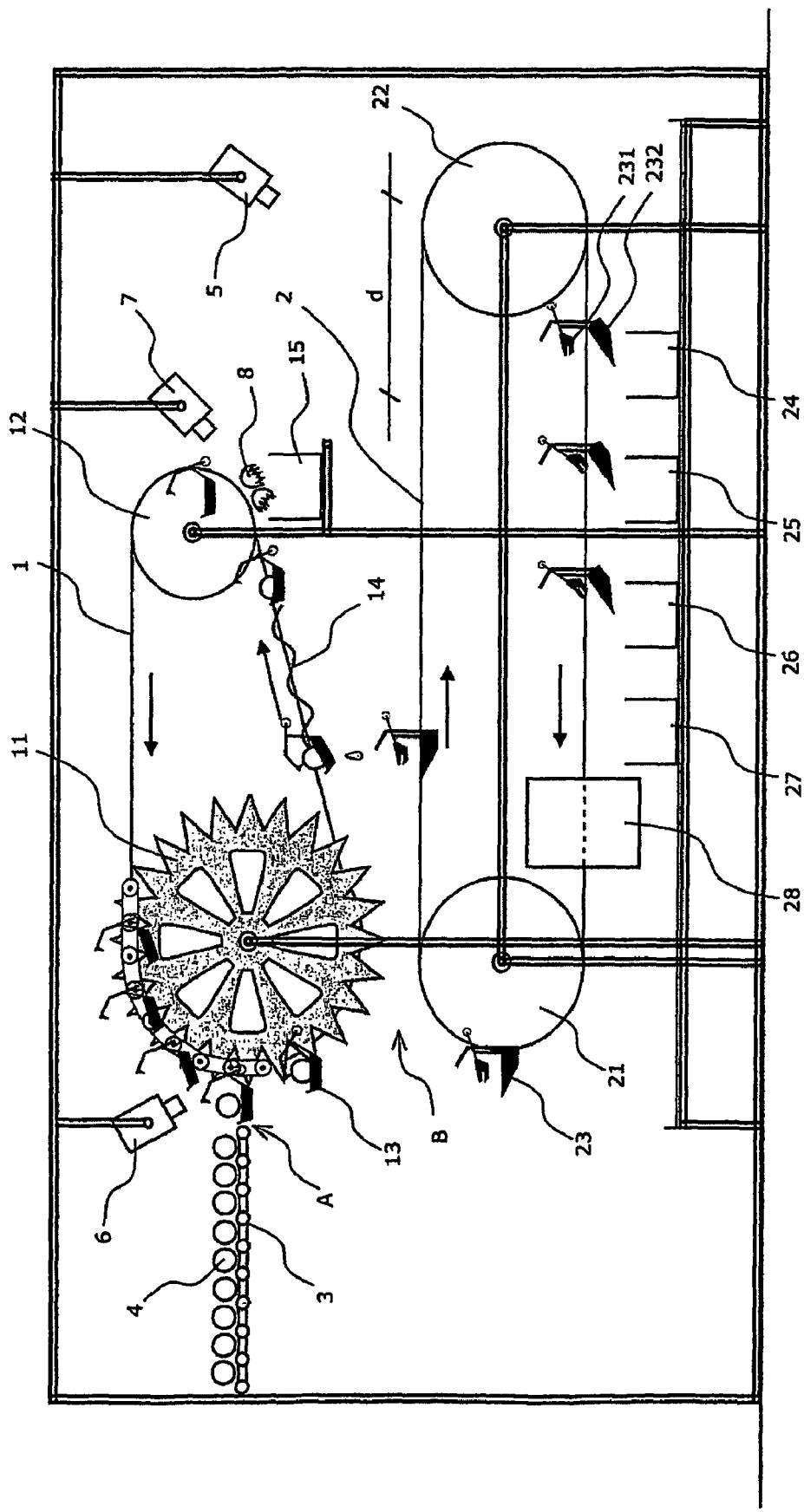

| | | | |
|---|---|---|---|
| 5,277,320 A | | 1/1994 | Corkill et al. |
| 5,377,583 A | | 1/1995 | Tomosue |
| 5,527,550 A | * | 6/1996 | Miles et al. .................. 426/478 |
| 5,858,434 A | * | 1/1999 | Thomas ........................ 426/299 |

FOREIGN PATENT DOCUMENTS

| | | | |
|---|---|---|---|
| GB | 943 832 | A | 12/1963 |
| GB | 943832 | | 12/1963 |
| JP | 7-229841 | A | 8/1995 |
| JP | 8082546 | A | 3/1996 |
| JP | 10048141 | A | 2/1998 |
| JP | 10048142 | A | 2/1998 |
| JP | 2000335515 | A | 12/2000 |
| JP | 2001037367 | A | 2/2001 |
| JP | 2001039405 | A | 2/2001 |
| JP | 2001086894 | A | 4/2001 |
| JP | 2001204294 | A | 7/2001 |
| JP | 2002262700 | A | 9/2002 |
| JP | 2004001803 | A | 1/2004 |
| JP | 2004194538 | A | 7/2004 |
| JP | 2004233327 | A | 8/2004 |

OTHER PUBLICATIONS

RM20001A000416.

RM20001A000416, Raschiatore, P. ITRM20010416 Jan. 13, 2003.

\* cited by examiner

|     | bc1 | bc2 | bc3 |
| --- | --- | --- | --- |
| br1 | 2 | 1 | 2 |
| br2 | 3 | 2 | 2 |
| br3 | 2 | 2 | 2 |
| br4 | 2 | 18 | 3 |
| br5 | 1 | 1 | 2 |
FIG.4a
|     | rc1 | rc2 | rc3 | rc4 | rc5 | rc6 |
| --- | --- | --- | --- | --- | --- | --- |
| rr1 | 1 | 1 | 1 | 1 | 1 | 1 |
| rr2 | 1 | 0 | 1 | 1 | 1 | 1 |
| rr3 | 2 | 1 | 1 | 0 | 1 | 1 |
| rr4 | 1 | 9 | 1 | 1 | 9 | 1 |
| rr5 | 1 | 0 | 1 | 1 | 1 | 1 |
FIG.4b
|     | bc1 | bc2 | bc3 |
| --- | --- | --- | --- |
| br1 | 2 | 1 | 2 |
| br2 | 3 | 2 | 2 |
| br3 | 2 | 2 | 2 |
| br4 | 2 | 18 | 3 |
| br5 | 1 | 1 | 2 |
FIG.4c
|     | rc1 | rc2 | rc3 | rc4 | rc5 | rc6 |
| --- | --- | --- | --- | --- | --- | --- |
| rr1 | 1 | 1 | 1 | 1 | 1 | 1 |
| rr2 | 1 | 0 | 1 | 1 | 1 | 1 |
| rr3 | 2 | 1 | 1 | 0 | 1 | 1 |
| rr4 | 1 | 9 | 1 | 1 | 9 | 1 |
| rr5 | 1 | 0 | 1 | 1 | 1 | 1 |
FIG.4d

METHOD OF MONITORING THE BREAKING OF EGGS, AN EGG RECEIVING DEVICE FOR HOLDING THE CONTENTS OF AN EGG, AND AN EGG BREAKING APPARATUS COMPRISING SUCH AN EGG RECEIVING DEVICE

A method of monitoring the breaking of eggs, an egg receiving device for holding the contents of an egg, and an egg breaking apparatus comprising such an egg receiving device The present invention relates to a method of monitoring the breaking of eggs, where eggs are fed to a plurality of egg breaking devices by means of a feeder, each egg breaking device receiving one egg at a time, where the shell of each egg is broken by means of the respective egg breaking device and the contents of each egg are collected in an egg receiving device, each egg receiving device receiving the contents of only one egg in each process cycle, and where the remains held by each egg breaking device after the breaking of the eggshell are discharged to a waste receptacle and the contents of the egg receiving device are discharged into one or more product receptacles. In addition the invention relates to an egg receiving device for holding the contents of an egg and to an apparatus having means for performing such a monitoring.

Automated monitoring of egg breaking apparatuses is known in connection with detecting possible traces of yolk in the albumen in order to ensure the quality of the product delivered by the egg breaking apparatus. The eggs fed to the apparatus can have variations in the properties, such as varying size or shell thickness, or the eggshells may be weakened by cracks. And the devices on the egg breaking apparatus can also malfunction. These are all factors that influence the egg breaking process. Current egg breaking apparatuses operate at high speed and with fixed settings for extended periods of time. It is well known and accepted that a consequence of running with high speed and standardised settings is an occasional failure, where whole eggs are dropped or not broken or where both the shell and the yolk membrane are broken for one reason or the other.

The object of the present invention is to detect systematic failures in the egg breaking process at an early stage.

With a view to this, the method according to the present invention is characterized in that the presence of at least one of the fault conditions (a) egg is dropped, (b) eggshell is unbroken or (c) yolk membrane is broken is registered automatically, and that the presence of an abnormality in the egg-breaking is presented to an operator.

An abnormality in the egg-breaking can occur due to a malfunction of the apparatus, such as a particular egg breaking device being blocked by egg residue and therefore unable to break the eggs properly, or a mechanical failure in a spring acting on knives for breaking the shell, etc. Due to the large capacity of egg breaking apparatuses it is not possible to distinguish systematic errors resulting from an abnormality from occasional losses caused by e.g. a cracked egg or to properties of the eggs such as for example one eggshell being extraordinarily thick or thin. A general maladjustment of the apparatus in relation to the size or type of eggs being processed may of course also lead to failure, and such maladjustment can also cause the presence of an abnormality in the egg-breaking process.

The detection of a systematic failure in egg breaking can take into account that concurrent random failures may occur, e.g. due to failures in the eggs supplied to the apparatus, such as a partly broken shell or an inherent variation in the shell thickness which is not detected from the outside of the egg. Failures that are unrelated to the cycle of the egg breaking process may be considered as random failures.

In the present context the term "presence of an abnormality" is meant to embrace the location of an egg lost, unbroken or with a broken yolk membrane or the timing in the detection thereof. The use of timing is, however, less preferred as such a registration will depend of the velocity of the system.

The presentation to the operator of an abnormality may be in the form of an alarm being sounded, a visual indication on a display, the machine being stopped, a malfunctioning egg breaking device being automatically transferred to a servicing station, or the like.

The actual detection of dropped, unbroken or damaged eggs may be performed in at least two different ways; one being to detect if each of the egg breaking devices does in fact receive an egg from the feeder as well as at least one property of the contents received into each egg receiving device and on this basis to determine when an abnormality occurs, and the other being to register at least one property of the remains discharged to the waste receptacle from each egg breaking device.

Preferably, for each process cycle, an egg received status is established for each of the egg breaking devices, said status being either actual reception of an egg from the feeder or no reception of an egg from the feeder, and at least one property of each egg receiving device with possible contents is detected and compared to at least one expected value based on said egg received status. Such a detection of the delivery of an egg to the egg breaking device and a corresponding detection of whether this egg has been properly broken by the device (the expected values are presence of yolk and presence of albumen separated from the yolk) is fully sufficient to establish whether there is an abnormality or not. If for example an egg is dropped, the system will register that nothing is delivered to the egg receiving device, even though an egg was in fact delivered to the egg breaking device, and that at least the contents of the egg must therefore have been lost.

By detecting at least one property of the remains discharged to the waste receptacle from each egg breaking device and comparing said property to at least one expected value, the dumping of an unbroken egg can be detected. To give an example, a weight sensor can measure the weight of remains discharged at each discharge. The expected value is the standard weight of eggshells of a single egg plus some adhering additional material. But if the measured weight is much larger and corresponds to the weight of a whole egg the presence of an abnormality is to be registered.

It is of course to be understood that the registration at the feeder may be combined with the registration at the waste receptacle or that the above embodiments may be combined, so that a registration is performed at all three point, i.e. at the feeder, at the egg receiving device and at waste receptacle. Similarly a registration of only the contents received by the egg receiving devices may be used.

The actual monitoring may comprise a registration of at least one property as mentioned above by means of a photocell, a vision based system, such as a digital camera, an inductive sensor coupled to a mechanical device or a capacitive proximity sensor. The use of a vision based system is preferred at least for the detection of the contents received by the egg receiving devices as this may be achieved with relatively cheap and simple means and in addition the operator may manually inspect the image, which can give rise to the indication of possible failure, thus enabling him to better evaluate if and how to intervene.

In a preferred embodiment the albumen of each egg is collected in a cup of the egg receiving device and the yolk of each egg is retained in a holder of the egg receiving device, and at least one detection device is used for determining at least one property of the egg receiving device with possible contents. In this manner it is for example possible to detect if the contents of the egg have in fact been received, if the yolk have been damaged causing a contamination of the albumen or if a particular egg is otherwise tainted.

In a preferred embodiment the detection device determines the translucence of the albumen or the colour of the yolk, as these parameters are particularly expressive of a number of common defects.

The determination of these properties may be performed in any suitable way, and if a camera based system is used a light source may advantageously be utilized to illuminate the albumen and/or yolk. Especially the use of a translucent cup and a light source illuminating the translucent cup from a side opposite the detection device is expedient as this provides a highly reliable monitoring system that can operate at high speed to detect failures in the egg breaking process.

To minimize the number of images needed for evaluating the quality of the eggs it is furthermore preferred that one image showing possible contents of both the albumen cup and the yolk holder is used to determine whether contents are present therein. Alternatively two images showing the albumen and yolk, respectively, may be used and a separate analysis may be performed on each of the images.

The comparison between the detected and expected values is preferably performed by means of an electronic evaluation unit, such as a computer.

It is preferred that the presentation to the operator of the presence of an abnormality in the processing of the eggs comprises information on the location of the egg breaking or receiving device causing the abnormality. By presenting information on the location of the device causing the abnormality the operator saves considerable time in localizing the cause of the problem, and the downtime of the apparatus is advantageously short.

In an even more operator friendly version the information on the location is presented to the operator by stopping the egg breaking or receiving device causing the abnormality at a predetermined inspection position. All the operator needs to do is then to inspect the faulty device and alleviate the fault condition by exchanging or repairing the device.

According to another aspect of the present invention it also relates to an egg receiving device for holding the contents of an egg and comprising a cup for receiving the albumen of the egg and a holder for receiving the yolk of the egg, where the cup comprises a translucent material. This may e.g. be effected by moulding the cup in mainly one piece of a translucent material. The cup can e.g. be moulded in a plastic material or in a transparent material as glass or reinforced glass. The translucency allows in a very simple and advantageous manner use of the cup in monitoring systems for detecting the presence of albumen in the cup or of yolk in the albumen.

In a preferred embodiment the yolk holder is also made from a translucent material, whereby the presence of yolk in the holder may be determined as a reduced transparency of the holder with possible contents.

Preferred translucent materials are plastics, such as polyethylene (PE), polyoxymethylene (POM), polyvinylidenflourid (PVDF) or polypropylen (PP). In order to obtain a suitable contrast between albumen and other matters the translucent material is in an embodiment opaque, preferably with a white colour.

In a further embodiment the cup and the holder are located on a common mounting bracket, which may be attached to a carrier by means of a single fastening device. This provides for a particularly simple mounting of the cup and the holder, which in the event of defects may be exchanged rapidly. The fastening device could for example be a screw bolt or a similarly easily removable device, but it is particularly preferred that the carrier and fastening device are designed in a manner allowing a click-on attachment of the fastening device to the carrier and a click-off detachment. This may for example be achieved by making the mounting bracket from a relatively flexible material such as plastic, a projection thereon acting as fastening means, or by providing the mounting bracket with a spring loaded fastening means.

The present invention also relates to an egg breaking apparatus, comprising a plurality of egg breaking devices, each for holding and breaking single eggs, a feeder for feeding eggs individually to each egg breaking device, a plurality of egg receiving devices for receiving the contents of eggs broken by the egg breaking devices, each egg receiving device being designed to receive the contents of a single egg at a time, and each egg receiving device comprising a cup for receiving the albumen of the egg and a holder for receiving the yolk of the egg, a waste receptacle for receiving the eggshell and possible other remains, a number of product receptacles for receiving the contents of the egg receiving devices, and at least one detection device.

Such an apparatus is according to the present invention provided with individual egg receiving devices that comprise a cup of translucent material of the above-mentioned design and a detection device in the form of a vision based device capable of detecting at least the transparency of the cup and possible contents therein, and which is furthermore provided with a light source, which is arranged to illuminate the translucent cup from a side opposite the detection device.

In a further embodiment the apparatus comprises at least one feed sensor establishing an egg received status for each egg breaking device during each process cycle, and an electronic evaluation unit connected to said at least one feed sensor and to said detection device, which electronic evaluation unit is adapted to record occurrences of an egg breaking device receiving an egg without delivering yolk to the holder and albumen to the cup of the egg receiving device associated with the egg breaking device.

Preferably, a data processing unit of the apparatus is designed with a memory, where at least one storage location is allocated to each of the egg receiving and egg breaking devices, and a movement sensor capable of detecting the movement of an egg breaking or receiving device from one position within the apparatus to another. When the egg breaking and receiving devices are moved from one position in the system to another a virtual pointer is correspondingly moved to the next storage location(s) corresponding to a new egg breaking and/or receiving device being located at a point of detection. If it is detected that the egg processed by means of a particular egg breaking or receiving device has been dropped, is unbroken or damaged the value of the corresponding storage location is written up by one, the value in each storage location thus corresponding to the number of egg affected by a certain defect during handling by the device in question.

The movement of the egg breaking and receiving devices may be tracked by means of inductive sensors, incremental encoders or the like, which generates a signal every time a new egg breaking or receiving device is moved into the detection position. In case of an abnormality or failure being detected, the device affected may be presented to an operator.

Preferably, one storage location is allocated to each of the egg receiving devices and two storage locations are allocated to each of the egg breaking devices, the value stored in the storage location of each egg receiving device corresponding to the number of eggs received by the device, where the yolk membrane was broken, the value stored in one of the storage locations of each egg breaking device corresponding to the number of eggs broken by the device, where the yolk membrane was broken, and the value stored in the second storage location of each egg breaking device corresponding to the number of eggs dropped or unbroken.

By this allocation of storage locations the presence of an egg with a broken yolk membrane is registered both for the egg breaking and the egg receiving device, meaning that it may be determined whether the damage to the yolk membrane was inflicted by the breaker during breaking or emptying of the egg or whether it was inflicted by the egg receiving device at receipt. On the contrary it will not be possible to distinguish between dropped and unbroken eggs as these are registered in the same storage location. This, however, is often considered less important as the error is unquestionably related to the egg breaking device which may then be replaced.

It is of course a necessary prerequisite for the detection and storage of the number of eggs dropped or unbroken that it is determined whether an egg is in fact delivered to each of the egg breaking devices. If such a determination is, however, not performed the number of cases of non-delivery will be added to the value of the second storage location of each egg breaking device.

Figure 2:
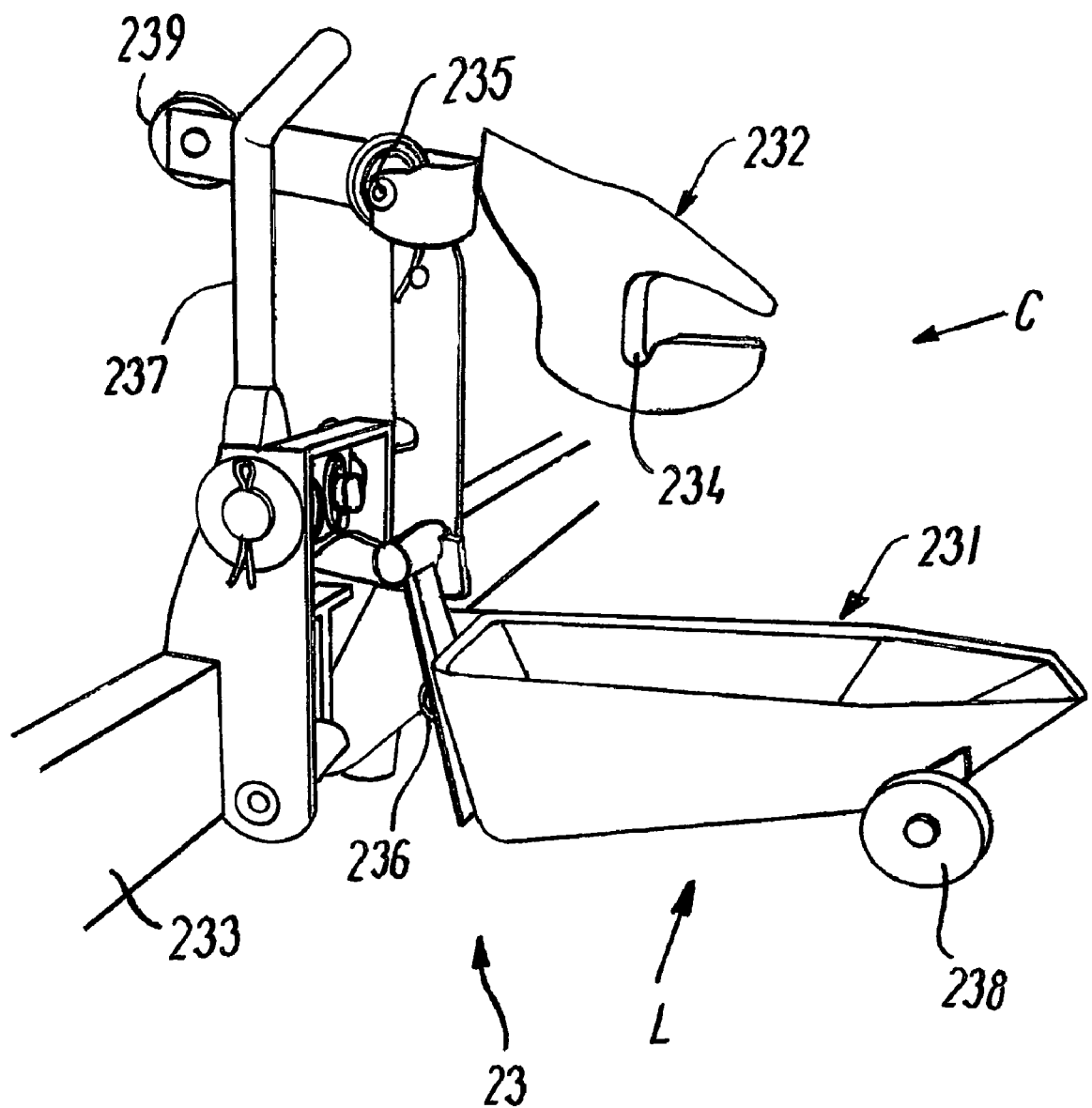
Figure 3:
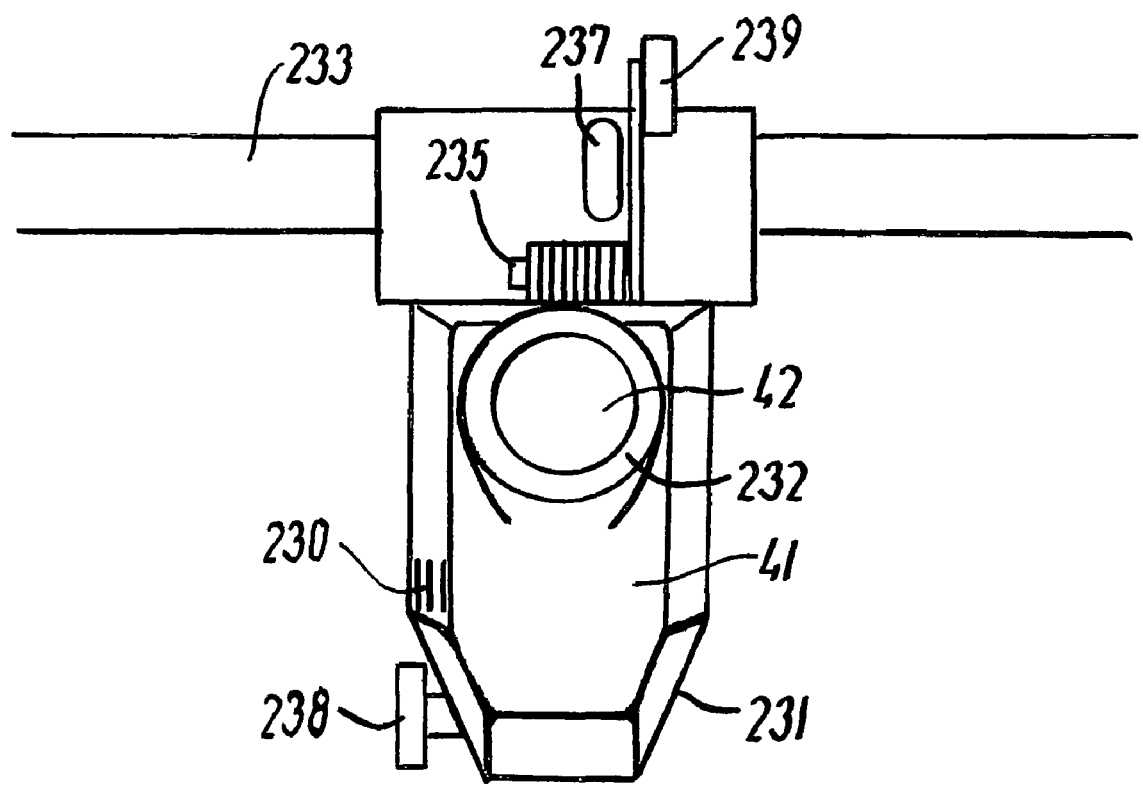

Examples of embodiments of the present invention will be described in further detail in the following with reference to the highly schematic drawings illustrating a preferred embodiment. In the drawing, FIG. 1 depicts an embodiment of an egg breaking apparatus according to the present invention, FIG. 2 shows an egg receiving device comprising a cup for receiving the albumen and a holder for receiving the yolk of an egg, seen from the side, FIG. 3 shows the egg receiving device in FIG. 2 seen from above, and FIG. 4 shows a representation of the storage locations of the memory of a data processing unit.

An egg breaking apparatus according to the invention may be embodied as shown in FIG. 1. The apparatus shown comprises two separate chains 1, 2 mounted on toothed turning wheels 11,12,21,22, where the uppermost chain 1 carries a plurality of egg breaking devices 13 and the lowermost chain 2 carries a plurality of egg receiving devices 23. FIG. 1 shows only a few egg breaking and receiving devices on the respective chains but it is to be understood that in practise the number of devices on each chain are larger such that they are evenly spaced with substantially the same mutual distance on both chains. Similarly, even though FIG. 1 shows only a single row of egg breaking and receiving devices it is to be understood that each of these devices may represent a column of devices extending perpendicularly to the plane of the drawing. Such columns may be mounted on horizontal bars stretching between two parallel chains, each column including for example eight or sixteen separate egg breaking or receiving devices. When using four chains instead of the two shown in FIG. 1, the number of turning wheels is of course also doubled.

A feeder 3 carries eggs 4 towards the uppermost chain and delivers them to the egg breaking devices 13 at point A, each egg breaking device receiving one egg in each process cycle.

The uppermost chain 1 is driven in a counter-clockwise direction and the lowermost chain 2 in a clockwise direction as indicated by the arrows, the speed of the two chains being substantially identical. In this way each egg breaking device 13 will meet an egg receiving device 23 at point B and the pair will travel together until reaching the upper right turning wheel 12 as seen in the FIG. 1.

The actual breaking of the egg 4 takes place in the vicinity of point B and the contents of the egg are then drained from the eggshell held by the egg breaking device 13 into the egg receiving device 23 underneath it. As may be seen the distance between the two chains 1,2 increases with the movement towards the second turning wheel 12 of the uppermost chain 1 causing a gradually increasing pull on the albumen and in particular on the chazala. In addition, the track followed by the egg breaking device may be provided with bumps 14 for causing a vibration, which encourages the albumen to let go of the eggshell, thus increasing the yield.

When reaching the turning wheel 12 the egg breaking device 13 travels upwards away from the egg receiving device 23, and the emptied eggshell 8 is discharged into the waste receptacle 15, from where it may be removed by means of for example a screw conveyor (not shown). The waste receptacle may also be located within the loop of the chain 1, the dumping of the eggshells taking place during the return travel of the egg breaking device, but this embodiment is less preferred as residual albumen may drip down onto the egg breaking devices and eggs underneath or even into the egg receiving devices containing the contents of other eggs.

The waste receptacle itself or a shoot (not shown) leading the remains into it may be provided with a detection device for registering one or more physical properties of the remains such as their weight, geometry or the like. In this way it is possible to determine, whether it was in fact an empty eggshell, which was discharged. In case of malfunction, such as if the egg breaking device has not been able to hold on properly to the egg, there may be no remains to discharge, or if it has not been able to break the egg, a whole egg may be discharged as waste.

The use of a camera 7 and an image processing equipment may give very accurate indications of the exact cause for the malfunction as an image of the remains discharged may for example tell whether the breaking was merely insufficient or if the eggshell has not been broken at all, which may be seen as tantamount to a more substantial malfunction of the breaking device. Similarly the pattern of the break in the eggshell may be monitored for any anomalies to thereby nip a beginning malfunction in the bud.

To enable a more precise identification of malfunctions, which means that no remains are being discharged, it is advantageous to also monitor, whether the feeder has in fact delivered an egg to the egg breaking device in question. This may advantageously be achieved by means of inductive sensors, capacitive proximity sensors, photocells or with a vision based system with a camera 6 arranged at or close to point A, but may also rely on the incorporation of a weighing cell in the egg breaking device or in the feeder.

After passing the upper right turning wheel 12, the egg receiving device 23 travels onwards along the chain 2 towards the turning wheel 22, the distance d between the turning wheels 12,22 of the two chain systems serving as an inspection section, where the contents of the egg receiving devices may be monitored manually or automatically. Equivalent to the monitoring of the remains discharged from the egg breaking devices, the monitoring of the contents of the egg receiving devices may be used to detect any malfunction of the system. An obvious example being the lack of contents, which occurs when the egg have either not been received by the egg breaking device, when it has been unintentionally dropped or when the eggshell have not been broken properly.

Another example is the presence of yolk in the albumen or of eggshell fragments, which is a clear indication of a malfunctioning egg breaking device.

Monitoring of the contents received into the egg receiving devices may for example be performed by means of a camera 5 arranged above the inspection section d as will be explained later.

Alternatively or as a supplement the egg receiving device may be equipped with a liquid level meter, which measures the amount of liquid received, or with a protein sensor arranged at a predetermined level, which is only reached if an entire egg have been received. These methods are however rather sophisticated and thus both expensive and delicate.

When reaching the underside of the chain 2, the contents of the egg receiving device are emptied into one or more product receptacles depending on the result of the inspection. In the simplest form eggs of an acceptable quality are discharged into one receptacle, whereas contaminated or otherwise unacceptable eggs are discharged into another. However, in the embodiment shown the apparatus is equipped with four product receptacles; one 24 for receiving pure albumens, one 25 for receiving pure yolks, one 26 for receiving mixtures of albumen and yolk and one 27 for receiving otherwise contaminated or unacceptable eggs.

For enabling the separate discharge of albumen and yolk the egg receiving device 23 is equipped with a yolk holder 231 and an albumen cup 232 as will be explained later and which may be emptied independently.

After the emptying the egg receiving device may pass through a washer or disinfector 28, which may treat all egg receiving devices or possibly only those, which have contained a contaminated egg or a mixture of albumen and yolk.

As may be seen from FIG. 1, the uppermost chain 1 is considerably shorter than the lowermost chain 2, meaning that the number of egg breaking devices 13 is smaller than the number of egg receiving devices 23 and that for each process cycle different egg breaking and egg receiving devices will be paired when meeting at point B. Preferably the number of egg receiving devices is twice the number of egg breaking devices, meaning that only two egg receiving devices will receive the contents of eggs broken with any one of the egg breaking device. If, however, it is desired that only the same two devices should be paired during each process cycle the chain systems can be modified accordingly, for example by making the uppermost chain longer, possibly adding an extra turning wheel (not shown), or by adding a buffer (not shown) delaying the advancement of the egg breaking devices.

FIG. 2 shows a preferred embodiment of the egg receiving device 23, which is mounted on a bar 233 together with several other egg receiving devices (not shown). The device comprises a cup 232 for holding the albumen of the egg and a holder 231 for holding the yolk. In practise, the entire contents of the egg are initially received by the holder, which retains the yolk while allowing the albumen to drain off over the edge and through passages 234 into the cup located below it.

For discharging their contents each of the yolk holder 231 and the albumen cup 232 may pivot about a respective point of suspension 235, 236. The pivoting of the holder and cup is controlled by means of a mechanism operated by the arm 237, the position of which determines into which product receptacle the contents of the holder and cup are discharged. One position, which is preferably the default position, corresponds to both the albumen and yolk being uncontaminated, while a second and third position, where the arm has been pushed to the side (towards and away from the viewer in FIG. 2, respectively) corresponds to the albumen and yolk being mixed and to the egg being otherwise contaminated, respectively. An operator may do the shifting manually in connection with manual or automated inspection or the system may be fully automated. The abutment wheel 239 is used to keep the yolk holder 231 in place during emptying of the albumen cup 232.

After discharging their contents the egg receiving device is brought back to its initial position by means of the wheel 238, which comes into contact against an abutment (not shown) on the frame of the apparatus as the egg receiving device advances along the track of the chain 2.

FIG. 3 shows the receiving device of FIG. 1 seen from above, where the albumen of an egg is located in the lowermost cup 232, while the yolk 42 is located in the uppermost holder 231. An image corresponding to this one may be used for detecting whether a yolk has in fact been received by the egg receiving apparatus and if there are any contaminations or tainting of particularly the yolk. The monitoring of the presence of a yolk in the holder 231 may be sufficient to achieve a sufficient monitoring of the system. No yolk will then be indicative of no egg being delivered from the feeder or of the egg being dropped by the egg breaking device, while the breaking of the yolk membrane will result in the yolk holder containing only traces of the yolk.

If, however, it is desired to monitor both the contents of the cup 232 and the holder 231 it is preferred to use an oblique camera angle as indicated in FIG. 2 by the arrow C to thereby make sure, that no part of the albumen held in the cup is hidden behind the holder.

One image showing the contents of both the cup and the holder may then be used, which will minimise the number of routines and thus optimise the process compared to a separate evaluation of the contents of the cup and the holder. This also supersedes the otherwise necessary cataloguing of the relationship between two images showing the yolk and albumen originating from the same egg.

The colour of the albumen 41 and yolk 42 may be used as a direct indication of the condition thereof, but a contamination of the albumen may advantageously be determined as a reduced translucence thereof, which may be causes by the albumen containing blobs of yolk or eggshell fragments or by the albumen being abnormally milky or unclear. The former two types of contaminations primarily serves as an indication of a malfunctioning egg breaking device, whereas the latter can normally be attributed to the egg being bad or rotten.

The translucence may be determined by using a cup having for example a bluish colour and determining to what degree this colour is visible through the albumen. A blob of yellow yolk occurring in the albumen will locally neutralize the blue colour entirely, while a general milkyness of the albumen will cause the colour to be a lighter shade of blue. A similar effect may be achieved by providing the camera with a blue filter or by using a blue light source.

It is, however, preferred that the cup is made from a translucent material allowing at least some wavelengths to pass and that a light source is caused to illuminate it from below as indicated by the arrow L in FIG. 2, the light source preferably being arranged such that the light will never fall directly onto the lens of the camera 5.

The wavelengths of the light may be chosen depending on the type of contaminations expected to be found, an example being the screening for certain kinds of bacteria. In addition it may be advantageous to take two or more pictures using different wavelengths to thereby make different kinds of contaminants stand out as clearly as possible. Alternatively, the light received by the camera may be filtered or the images may be processed to intensify certain colours.

In a particularly preferred embodiment the images generated by the camera is black-and-white images or the images are converted into black-and-white images by means of a data processing unit. These black-and-white images are then processed by applying a limit value to the grey scale such that any image elements being lighter than this limit are displayed as white, while image elements that are darker than this limit are displayed as black. In the resulting image any blobs of yolk present in the albumen will thus appear completely black, whereas the albumen will appear completely white. If the image of a particular egg displays black elements it will the preferably automatically be classed as a mixture of yolk and albumen and the egg will thus be discharged into the mixed product receptacle 26.

To better distinguish between different types of contaminations and possibly also grade the severity of a given contamination, variations of a property such as colour and/or translucence within a single albumen or yolk may be determined. This method may for instance be employed for distinguishing between a piece of the shell membrane or an eggshell fragment being present in the albumen and a generally reduced transparency. Similarly, a spot of blood in a relatively light-colored yolk may be distinguished from a yolk having a darker yellow colour.

When monitoring the remains off each egg discharged to the waste receptacle, the remains may be allocate to one of at least three groups comprising "no remains", "eggshell only" and "whole egg". Ideally each egg breaking device should receive one egg in each process cycle, break it and discharge only the emptied eggshell, the remains thus being allocate to the group "eggshell only". The allocation to the group "no remains" will, however, be used when no egg has been delivered to the egg breaking device, when the egg have been unintentionally dropped or when the egg breaking device has not been able to discharge the remains. Similarly the group "whole egg" will be used if the egg has not been broken or the breaking has not been sufficient to allow emptying of the egg. An alarm or an indication of possible machine failure is preferably generated if the remains discharged to the waste receptacle are allocate to the group "whole egg" or if they are allocate to the group "no remains", even though an egg was received by the egg breaking device.

Statistics on the distribution of the eggs into the three groups will give a relatively easily manageable indication of the functioning of the machine and may for instance indicate if one particular egg breaking device is consistently malfunctioning. It is, however, to be understood that more groups may be employed such as for example a group representing eggs, which have not been entirely emptied.

The detection of an unbroken egg is preferably registered as a function of the location of detection. The determination of a failure at a certain apparatus location is preferably achieved by allocating at least one storage location in the memory of a data processing unit to each of the egg breaking and egg receiving devices.

FIG. 4 shows an example of the allocation of the storage locations corresponding to the different egg breaking and receiving devices.

As may be seen in FIG. 4a, the apparatus in this example comprises three columns bc1-bc3 of egg breaking devices, each of which comprising five devices arranged in rows br1-br5. Most of the egg breaking devices have dropped or been unable to break a few eggs since the machine was started and the value in the first subcolumn have been written up correspondingly, breaker 1 in row 2 for example having dropped or not been able to break three eggs. Even if the apparatus is functioning optimally some eggs will inevitably be dropped, not broken or damaged due to the inherent variations of natural products and to eggs being relatively fragile and values of 0 are therefore not to be expected.

In the present case the pattern of the values in the first subcolumns is quit uniform, which is not likely to be the case if eggs were not broken as the breaker in question would be likely to cause the same failure repeatedly. It may therefore be assumed that the eggs accounted for in the first subcolumns of the example have primarily been dropped.

In the second subcolumn the value corresponds to the number of eggs broken, where the yolk membrane has been damaged. Here too, a few of the eggs broken by each breaker have been damaged except for the breaker in row 4, column 2, where the yolk membrane was broken in 18 of the eggs processed. The breaking of the yolk membrane may be caused either by the breaker itself or at receipt at the egg receiving device. Which is the case may be seen by comparing the values in the storage location allocated to the egg breaking device with those allocated to those egg receiving devices, which receive the contents of eggs broken by it.

An array showing the status of the egg receiving devices is shown in FIG. 4b. Here each row rr1-rr5 consists of six different columns rc1-rc6, which for a system where the movement of the egg breaking and receiving devices are synchronized means that the apparatus has twice as many egg receiving devices as it has egg breaking devices. This embodiment is particularly preferred, as each egg breaking device will thus always be paired with the same two egg receiving devices, the egg breaking device completing two process cycles every time an egg receiving device completes one cycle. Accordingly, the contents received into the two egg receiving devices currently in columns rc1 and rc4 will both originate from eggs broken by means of the egg breaking device in column bc1 and so on.

If the breaking of the yolk membrane of the eggs broken by the egg breaking device in column bc2, row br4 had been a consequence of one of the egg receiving devices malfunctioning, it would be expected that the value in either column rc2 or in column rc4 of row rr4 of FIG. 4b would correspond approximately to the value in column bc2 of row br4 of FIG. 4a and the malfunction would then be located to that particular egg receiving device. This is however not the case in the present example where the value in columns rc2 and rc4 of row rr4 is both "9" and the defect must therefore be with the egg breaking device.

Whenever the egg breaking and receiving devices are moved from one position within the apparatus to another a new column of devices enters a detection positions, where the for example the contents held by the egg receiving device may be monitored as explained elsewhere in the text. These positions are indicated with pointer arrows in FIGS. 4a-4d. In the present case the breaking device pointer is moved from column bc1 to column bc2 as may be seen by comparing FIGS. 4a and 4c. Correspondingly the receiving device pointer is moved from rc1 to rc2 as may be seen by comparing FIGS. 4b and 4d. When in the detection position it is determined, whether the egg processed by the egg breaking or receiving device in question has been processed correctly or whether it should be assigned to either the class "dropped or unbroken" or to the class "damaged yolk membrane". If an abnormality is detected the value in the storage location(s) corresponding to the classing of the abnormality is written up by one.

The monitoring of the movement of the egg breaking and egg receiving devices may in principal be achieved by means of any device capable of giving a signal indicative of the event, an example been an electronic switch which is disconnected by a projecting member on the device.

Being able to determine the precise origin of a defect, such as a malfunctioning egg breaking device, is seen as particularly advantageous as this may decrease the time need to correct it and thus the resulting loss of production. In a preferred embodiment a malfunctioning egg breaking or receiving device will therefore automatically be brought to a servicing station (not shown).

It is to be understood, that the preferred embodiments of the invention described in the above are not to be seen as limiting the scope of the invention. Rather, a person skilled in the art will be able to conceive a number of modifications and combinations of the features described above, which will fall under the scope of invention as define by the claims.

The invention claimed is:

1. A method of monitoring breaking of eggs in a cyclic process, where eggs are fed to a plurality of egg breaking devices by means of a feeder, each egg breaking device receiving one egg having shell and contents at a time, where the shell of each egg is broken by means of the respective egg breaking device and the contents of each egg are collected in an egg receiving device, each egg receiving device receiving the contents of only one egg in each process cycle, and where remains held by each egg breaking device after the breaking of the eggshell and the collection of the contents are discharged to a waste receptacle and the contents of the egg receiving device are discharged into one or more product receptacles, said method including the steps of:

for each process cycle, establishing an egg received status for each respective one of the egg breaking devices using a feed sensor, said status being either actual reception of an egg from the feeder or no reception of an egg from the feeder, said status being established prior to breaking of the egg, automatically registering the presence of at least one of the conditions (a)-(c) for each of the egg breaking devices, respectively, based on an output of each egg breaking device after breaking of the egg and said status of each egg breaking device established by the feed sensor, the conditions (a)-(c) including:

(a) egg is dropped,
(b) eggshell is unbroken or
(c) yolk membrane is broken, and presenting the presence of an abnormality in the egg-breaking to an operator based on the registered condition.

2. Method according to claim 1, wherein at least one property of each egg receiving device with possible contents is detected and compared to at least one expected value based on said egg received status.

3. Method according to claim 1, wherein at least one property of the remains discharged to the waste receptacle from each egg breaking device is detected and compared to at least one expected value.

4. Method according to claim 1, wherein the egg receiving device has a cup for collection of albumen of each egg and a holder for retaining yolk of each egg, and that at least one detection device is used for determining at least one property of the egg receiving device with possible contents.

5. Method according to claim 4, wherein a light source illuminates the egg receiving device.

6. Method according to claim 4, wherein said at least one property is detected by means of a detection device comprised in the group consisting of a photocell, a vision based system, an inductive sensor, a capacitive proximity sensor, or a mechanical sensor.

7. Method according to claim 6, wherein a light source illuminates the egg receiving device.

8. Method according to claim 7, wherein a translucence of the cup with possible albumen is determined.

9. Method according to claim 8, wherein a light source illuminates the cup from a side opposite the detection device.

10. Method according to claim 6, wherein a digital camera is used in said vision based system.

11. Method according to claim 6, wherein one image of possible contents of both the cup and the holder is used to determine whether content is present in the holder and whether content is present in the cup.

12. Method according to claim 1, wherein, for each process cycle and for each of the egg breaking devices at least one property of the remains of each egg discharged to the waste receptacle is detected and compared to at least one expected value.

13. Method according to claim 12, wherein, for each process cycle, an egg received status is established for each of the egg breaking devices, said status being either actual reception of an egg from the feeder or no reception of an egg from the feeder, and that the at least one expected value is based on said egg received status.

14. Method according to claim 1, wherein the presentation to the operator of the presence of an abnormality in the egg-breaking comprises information on the location of the egg breaking device causing the abnormality.

15. Method according to claim 14, wherein the information on the location is presented to the operator by stopping the egg breaking device causing the abnormality at a predetermined inspection position.

* * * * *